United States Patent Office 3,634,483
Patented Jan. 11, 1972

3,634,483
PROCESS FOR PREPARING COMPOUNDS
CONTAINING THE OOF GROUP
Irvine J. Solomon, Skokie, James N. Keith, Lombard, and Andrew J. Kacmarek, Chicago, Ill., assignors to the United States of America as represented by the Secretary of the Air Force
No Drawing. Filed May 27, 1969, Ser. No. 828,330
Int. Cl. C07c *71/00*
U.S. Cl. 260—453 R                               1 Claim

ABSTRACT OF THE DISCLOSURE

The preparation of a mixture of propyl isomers having the formulas $CF_3CF_2CF_2OOF$ and $CF_3CF(OOF)CF_3$ is disclosed. The compounds are prepared by the reaction of dioxygen difluoride ($O_2F_2$) with perfluoropropene ($C_3F_6$) at a temperature of $-183°$ C. The mixture of isomers is useful as a powerful oxidizing agent.

BACKGROUND OF THE INVENTION (1) Field of the invention

This invention is in the field of perfluoro-oxyorganic compounds.

(2) Description of the prior art

Dioxygen difluoride has a melting point of about 109.7° K. and a boiling point of about 216° K. It may be prepared from the elements according to the method described by A. G. Streng and A. V. Grosse, "Addition and Substitution Compounds of Oxygen Fluorides" Second Annual Progress Report for the Office of Naval Research, Contract Nonr–2085(01), Research Institute of Temple University, Philadelphia, Pa., Jan. 19, 1962. It may be stored in a frozen condition at 90° K.

An article by A. G. Streng, J. Amer. Chem. Soc. 85, 1380 (1963) discloses the methods for reacting $O_2F_2$ in its various physical states with several inorganic chemical compounds. This article is prior art of particular interest for the following reasons: (1) The article reports that the reaction of $O_2F_2$ with solid $C_2H_5OH$ at temperatures near the melting point of $O_2F_2$ results in an explosion. (2) Also reported is the fact that, when 0.2 cm.$^3$ of liquid $O_2F_2$ was added to 0.5 cm.$^3$ of liquid $CH_4$ at 90° K., a violent explosion occurred. (3) A third fact of interest in the article is the report of a violent reaction between $O_2F_2$ and benzene at a temperature of 195° K. Thus, it has in the past been the belief in the art that useful fluorinated organic compounds were unlikely to result from the reaction of $O_2F_2$ with an organic compound even though the superb fluorinating ability of $O_2F_2$ has been no secret. Attempted reactions involving $O_2F_2$ and organic compounds have either resulted in explosions or in a reaction which produced a multitude of side reactions and a very low yield of the hoped for product.

To the inventors' knowledge, no compounds containing the OOF radical have ever been prepared before.

SUMMARY OF THE INVENTION

Dioxygen difluoride has now been used to prepare perfluoro-oxy-organic compounds containing the OOF group. The reaction of $O_2F_2$ with $C_3F_6$ at a temperature of $-183°$ C. utilizing $CF_3Cl$ as a solvent gives a respectable yield of a mixture of the isomers $CF_3CF(OOF)CF_3$ and $CF_3CF_2CF_2OOF$. Attempts to separate the two isomers from each other have thus far failed. However, the isomeric mixture is useful as an oxidizing agent.

DESCRIPTION OF THE PREFERRED EMBODIMENT

The following is an example of how $O_2F_2$ may be reacted with an organic compound ($C_3F_6$) to form the useful oxidizing agent of this invention.

EXAMPLE

Step 1: Place a sample of $C_3F_6$ in a small glass tube containing a magnetic stirrer and cool the tube to a temperature of $-183°$ C.

Step 2: Distill $O_2F_2$ into the tube. Distillation will usually result in a slight decomposition of the $O_2F_2$. Therefore, if a stoichiometric reaction is desired, a slight excess of $O_2F_2$ should be used. Some of the $O_2F_2$ will condense on the sides of the tube above the $C_3F_6$.

Step 3: Distill a solvent ($CF_3Cl$) into the tube and utilize the solvent to wash down the $O_2F_2$ frozen on the sides of the tube.

The reaction will begin at the moment that $O_2F_2$ comes into contact with $C_3F_6$ and is considered complete upon the disappearance of the red color of $O_2F_2$.

In practicing this invention the solvent was stripped from the reaction mixture, after completion of the reaction, by distillation through traps at $-80°$ C., $-138°$ C., and $-196°$ C. The $-138°$ C. condensate was redistilled through $-80°$ C., $-112°$ C., and $-126°$ C. traps. The $-112°$ C. condensate contained the $CF_3CF(OOF)$ $CF_3$—$CF_3CF_2CF_2OOF$ mixture.

A comparison of the $F^{19}$ NMR spectrum with literature data available on fluoroxypropanes is given in Table I to show how the existence of the OOF compounds was proved.

TABLE 1.—NMR SPECTRAL CHARACTERISTICS OF OOF COMPOUNDS

| Peak No. | C—F shift, p.p.m. [a] | Assignment [b] | Lit. value [c] |
|---|---|---|---|
| 1 | 144.2 (d) | C—F | 137.4, i-$C_3F_7OF$ |
| 2 | 132.8 | —$\underline{CF_2}$—$CF_2$—O | 127.0, n-$C_3F_7OF$ |
| 3 | 96.2 | —$CF_2$—$\underline{CF_2}$—O | 93.9, n-$C_3F_7OF$ |
| 4 | 85.0 (t) | $\underline{CF_3}$—$CF_2$ | 82.5, n-$C_3F_7OF$ |
| 5 | 80.1 | $(\underline{CF_3})_2$—CF—O | 75.6, i-$C_3F_7OF$ |
| 6 | −292 (d) | —OOF | |

[a] (d) = doublet; (t) = triplet.
[b] The flourine atom for each assignment is underlined.
[c] Literature values for C—F shifts are for corresponding peaks in the $C_3F_7OF$ spectrum.

Analysis of the relative peak areas of the $F^{19}$ NMR spectrum indicated that the mixture of isomers contained about 25% by weight $CF_3CF_2CF_2OOF$ and about 75% by weight $(CF_3)_2CFOOF$. The isomers could not be separated by gas chromatography.

We claim:
1. The process for preparing a mixture of

$$CF_3CF_2CF_2OOF$$

and $CF_3CF(OOF)CF_3$ which comprises:
 (a) reacting approximately stoichiometric amounts of $O_2F_2$ and $C_3F_6$ in the presence of $CF_3Cl$ solvent at a temperature of about $-183°$ C. until red color produced by the reaction disappears,
 (b) distilling the reaction mixture through traps at $-80°$ C., $-138°$ C., and $-196°$ C., and recovering that portion which condenses at $-138°$ C., (c) redistilling the −138° C. condensate through traps at −80° C., −112° C., and −126° C., and
(d) recovering the −112° C. condensate which contains said mixture of $CF_3CF_2CF_2OOF$ and $$CF_3CF(OOF)CF_3$$

in about a 1:3 weight ratio.

References Cited

Thompson: "Bis(perfluoroalkyl)trioxides," (1967), JACS 89, pp. 4316–19 (1967).

Solomon et al.: "The reaction of dioxygen difluoride and perfluoropropene etc.;" (1968), JACS 90, pp. 6557–59 (1968).

Streng: "The Chem. Props. of dioxygen fluoride" (1962).

LEWIS GOTTS, Primary Examiner

G. HOLLRAH, Assistant Examiner

U.S. Cl. X.R.

252—187